Figure 1:
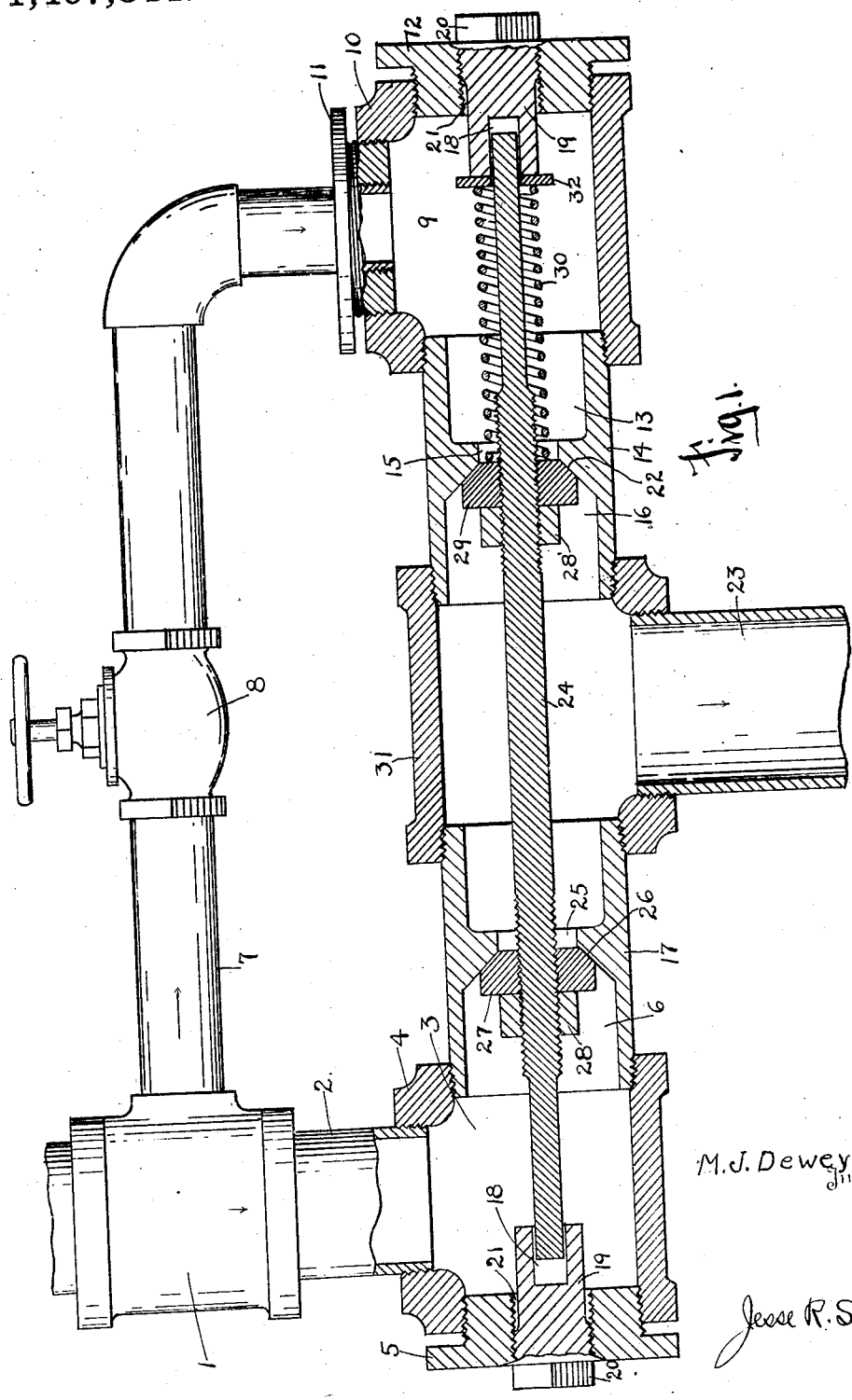

M. J. DEWEY.
CONSTANT VOLUME VALVE.
APPLICATION FILED JUNE 8, 1920.

1,407,844.

Patented Feb. 28, 1922.

M. J. Dewey, Inventor

Jesse R. Stone, Attorney

UNITED STATES PATENT OFFICE.

MAURICE J. DEWEY, OF HOUSTON, TEXAS.

CONSTANT-VOLUME VALVE.

1,407,844.  Specification of Letters Patent.  Patented Feb. 28, 1922.

Application filed June 8, 1920. Serial No. 387,341.

*To all whom it may concern:*

Be it known that I, MAURICE J. DEWEY, a citizen of the United States, residing at Houston, Harris County, Texas, have invented a certain new and useful Improvement in Constant-Volume Valves, of which the following is a full, clear, and exact description, such as will enable others skilled in the art to which it appertains to make and use the same.

My invention relates to an improvement in constant volume valves for use in regulating the flow of a fluid through a passage.

It is frequently desirable in supplying fluids such as water, oil, gas, steam, etc., for consumption that some means be provided to assure a constant, or approximately constant, flow of the fluid to the consumer, through any particular conducting pipe. It is apparent that if the known rate of flow is constant and the area of the orifice be known, the amount supplied during a given time may be found within approximate accuracy.

The object of my invention is to provide an automatic valve by means of which a constant flow of fluid through a passage may be had regardless of the pressure of the fluid at the inlet or the back pressure at the outlet.

Another object is to provide a valve of the nature described which will regulate a constant flow of a fluid therethrough regardless of variations in pressure at both outlet and inlet and which, in case of gases, will be unaffected by variations of pressure at the outlet and in which the flow will be constant where the pressure at the inlet is approximately constant.

Other objects and advantages will more clearly appear in the specification which follows.

Referring to the drawing wherein the preferred embodiment of my invention is disclosed, the figure shows a plan view of a system of pipes employing my invention, the valve chamber of which is in central longitudinal section.

The inlet pipe, adapted to conduct the fluid to my device, leads into a T coupling 1, having a connection through the pipe 2 to the chamber 3 formed within another T coupling 4. The outer end of the coupling 4 is closed by a plug 5 screwed therein. The opposite end of the coupling 4 is threaded interiorly for attachment to a member 17 having at the entrance thereto the valve chamber 6.

The inlet T, 1, also has a laterally branching pipe 7 of comparatively small diameter leading by way of a valve 8 to the chamber 9 within the T 10, to which said pipe is attached by being screwed into a plug connection 11, which is in turn exteriorly threaded for attachment to said T 10. This smaller pipe 7 forms a by-pass from the inlet to the chamber 9. The outer end of the T coupling 10 is closed by a plug or nut 12, similar in structure to the plug 5, previously mentioned. Both these plugs 5 and 12 are provided with a central opening 21 threaded to receive a pin 19 having a squared head 20 and projecting at the inner end into the chamber within the T. The said inner end has a cylindrical recess 18 counterbored therein to serve as a guide, as will be later explained.

The other end of the T 10 is threaded interiorly to receive one end of the tubular member 14, provided with a chamber 13 leading through the valve passage 15 to the valve seat 22 in the valve chamber 16.

The tubular members 14 and 17 are connected to the opposite ends of a coupling T 31, which has a lateral outlet pipe 23 leading to the place where the fluid is to be used. As will be seen in the drawing, the T's 4 and 10 and the connecting members 14, 31 and 17 are in alignment. A valve rod is located in the passage thus formed through this system, the ends of said rod being received within the sockets 18 within the inner ends of the pins 19. The sockets 18 are deep enough to allow a limited longitudinal play of the rod 24 therein as will be seen in the drawing. The ends of the said rod are reduced in diameter for a short distance and said reduced ends fit loosely within the sockets 18.

The tubular member 17 has a central restricted passage 25 forming a valve seat 26 on the side thereof away from the central coupling 18. Valve 27 is formed to close the passage 25. It is cylindrical in shape and tapered to fit upon the seat 26. Said valve is mounted upon the rod 24, upon which it has a threaded connection, and is held in position thereon by a lock nut 28.

At the other entrance to the T 31 the passage 15 of the member 14 is closed by a valve 29 similar in shape to valve 27 and seated upon the valve seat 22 on the side of the passage 15 toward the coupling T 18. It has a threaded connection on the rod 24 and locked in the desired position thereon by a lock nut 28'.

By means of this arrangement, it will be noted that the movement of the rod 24 in one direction will open both valves 29 and 27 while a movement of the rod in the opposite direction will force the valves into their seats and close the passages 15 and 25.

Surrounding the rod 24 within the chamber 9 is a helical spring 30. Said spring bears at its outer end upon a washer 32 on the end of the pin 19 and encircling the reduced end of the rod 24. The opposite end of the spring bears upon the face of the valve 29 and, the spring being under compression, tends to force the valves 29 and 27 from their seats with a constant pressure. The valve rod 24 is guided and limited in its longitudinal movement by the walls of the sockets 18 into which it fits.

The operation of my device may now be readily understood. The gate valve 8 is open. If water or other similar liquid is forced through the inlet T 1, it will have free passage through the pipes 2 and 7 to the valve controlled passages 25 and 15. The spring will ordinarily tend to hold the valves from their seats and allow a flow of the liquid through the outlet pipe 23. As the by-pass 7 is smaller than the pipe 2 the pressure would tend at first to be greater in the chamber 6 than in the chamber 13. As a result, the excess pressure in the chamber 6 would tend to seat the valves against the tension of spring 30. If such action occurred the liquid would flow through pipe 7 building up the pressure in chamber 13 until it became nearly equal to that in the chamber 6 and the spring 30 would then open the valves and allow the liquid to flow past the valves as before. This equalization of pressure is almost instantaneous and the valves 27 and 29 would normally be held out of their seats by approximately the amount of the pressure due to the action of the spring 30. This is not exactly true, however, due to the drop of the pressure of the liquid in passing through the by-pass 7. The pressure would always tend to be greater in the chamber 6 than in the chamber 13, due to this drop, the drop itself being caused in pipe 7 by the smaller orifice thus produced in the smaller pipe. The pressure would tend to equalize itself, as previously described, until the spring was allowed to unseat the valves, and then the adjustment would stop, the liquid pressure in chamber 6 being still slightly in excess of the fluid pressure in the chamber 13. Thereafter, if variations of pressure occurred in the inflowing liquid in the inlet pipe it will be apparent that the device would immediately accommodate itself to the pressure change and the valves would open to the usual amount allowing the passage of a constant amount of liquid. Owing the the incompressibility of liquids, changes in pressure will not change their density, and as the drop in pressure between T 1 and chamber 9 is always constant and equal to the net lift of helical spring 30, the volume passing through valve 8 therefore will depend only on the size of opening through the valve, and the volume passing through valve 8 is directly proportional to the total volume delivered at 23.

If gas, air, or steam were conducted through the device, however, the fact that they are compressible would affect the true volume, because of the change in density of gases as their pressure changes. If, however, the inlet pressure remains constant the volume of gases passing through the valves 27 and 29 will remain constant, and the rate of flow through them can be changed only by opening or closing valve 8. It is apparent that variations in back pressure at the outlet 23 will not affect the rate of discharge as it would be exerted equally against valves 27 and 29 and the resultant would be nil. This would be the same both for liquids or gases. My device is then not affected by back pressure, or variations therein, at the discharge orifice. This device, as shown and described, is understood to be placed either longitudinally or with the inlet end up. It is apparent that if the chamber 9 were extending upwardly, the weight of the rod 24 would take the place of the spring which might then be omitted. It is also apparent that other types of valves could be used, the special construction shown being only one embodiment which my invention might assume. Various other changes could be made in my device without departing from the spirit of my invention. I do not wish therefore to be confined to the particular construction described and shown.

Having thus described my invention, what I claim as new and desire to protect by Letters Patent is:

1. In a device of the character described, two connected valve chambers, valves controlling the passage of fluid therethrough, said valve being mounted on a single valve rod, and adapted to open in the same direction, a large inlet pipe adapted to conduct fluid against one of said valves so as to cause it to close, a by-pass leading to the opposite face of the other valve to assist in equalizing the fluid pressure, and a spring acting to normally force said valve rod and valves from their seats.

2. In a device of the character described, two connected valve chambers, an outlet between said chambers, valves controlling the passage of fluid through said valve chambers, said valves being mounted on a single valve-rod, guides for said rod, an inlet pipe adapted to conduct fluid into one of said valve chambers so as to close the same, a by-pass from said inlet to the opposite side of the second valve, and a spring on said rod tending to force said valves from their seats.

3. In a device of the character described, an inlet pipe, an outlet pipe, a constricted passage connecting said pipes, a valve therein adapted to close by the flow of fluid therethrough, a by-pass from said inlet to said outlet, a valve in said by-pass adapted to open by the flow of fluid therethrough, means connecting said valves for simultaneous operation and means tending to force said valves from their seats.

4. In a device of the character described, an inlet pipe, an outlet pipe, a connecting pipe between said inlet and outlet, a valve therein adapted to close by the flow of fluid from said inlet to said outlet, a by-pass from said inlet to said outlet, a valve in said by-pass adapted to open by the flow of fluid to said outlet, a rod connecting said valves, and means tending to force said valves from their seats.

5. In a device of the character described, an inlet pipe, an outlet pipe, a passage from said inlet to said outlet, a valve in said passage, adapted to close by the flow of fluid to said outlet, a by-pass from said inlet to said outlet pipes, a valve therein opening toward said outlet, a rod connecting said valves and a spring on said rod tending to open said valves.

6. In a device of the character described, two valve chambers connected to a common outlet, a valve rod extending through said valve chambers, valves on said rod in said valve chambers, an inlet pipe to one of said chambers, a by-pass to the second chamber, so arranged as to approximately equalize the pressure on both said valves and means on said rod to normally force said valves from their seats.

7. In a device of the character described, two connected chambers, an outlet between said chambers, a valve permitting fluid to pass from one of said chambers to said outlet, an inlet pipe adapted to conduct fluid under pressure into the other of said chambers tending to close said valve, a second pipe from said inlet to said first named chamber, and means tending to force said valve into open position.

In testimony whereof, I hereunto affix my signature this the 5th day of June, A. D., 1920.

MAURICE J. DEWEY.